of water for ordinary use. A stronger solution containing 10% of the complex is suitable for use as a surgical scrub.

EXAMPLE 2

75 lbs. of Ethomeen S/15 (the reaction product of 5 moles of ethylene oxide with soya amine, commercially available from Armour Hess Chemicals Ltd.) were mixed with 12.7 lbs. of iodine with slight warming. The resulting product was a dark brown oil, giving a clear brown solution in water. The 1% aqueous solution had a pH of about 4.

The product is a disinfectant especially effective against fungi, for example fungi of the genus Trichophyton, fungi of the genus Microsporum and Aspergillus fumigatus. An example of a commercial formulation is a 20% w./v. solution in propylene glycol. This is diluted to 10% for use.

EXAMPLE 3

89.7 lbs. of Ethomeen C/12 are melted and 76.2 lbs. of iodine are added thereto with stirring, the temperature of the mixture then rising to over 100° C. This mixture is then allowed to cool slowly and removed from the vessel in which it was prepared as a dark reddish-brown mass which is soluble in water and in acid aqueous solution to give a red-brown solution. The product is a disinfectant of high germicidal power.

I claim:

1. A disinfectant composition comprising the reaction product of iodine with an alkoxylated primary amine or mixture of such amines having the formula:

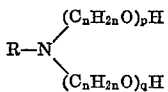

where R is a monovalent hydrocarbon radical with up to 18 carbon atoms or a hydroxyalkyl radical with from 2 to 18 carbon atoms; n is 2, 3 or 4 and the average of the totals of p plus q is not less than 1.5 nor more than 10, the proportion of iodine being from 0.8 to 1.6 atom equivalents per mole equivalent of amine.

2. A composition as claimed in claim 1 in which R is an alkyl group $C_mH_{2m+1}$ where m is at least 3.

3. A composition as claimed in claim 1 in which the average of the totals of p plus q is not less than 2 nor more than 5.

4. A composition as claimed in claim 1 in which the proportion of iodine is from 0.8 to 1 atom equivalent per mole equivalent of amine.

5. A composition as claimed in claim 1 in which the amine is the reaction product of 2 moles of ethylene oxide with cocoamine.

6. A composition as claimed in claim 1 in which the amine is the reaction product of 5 moles of ethylene oxide with soya amine.

7. A composition as claimed in claim 1 in the form of an aqueous solution of the reaction product and containing hydrogen chloride.

ELBERT L. ROBERTS, Primary Examiner

U.S. Cl. X.R.

424—150 for heavy contamination and one part in 400 parts of distilled water for heavy contamination and one part in 400 parts of distilled water for light contamination.

If particularly required as a fungicide, the fungicidal properties of the material can be enhanced by formulating the material with up to 1.6 atom equivalents of iodine for every mol equivalent of the amine. This causes some of the iodine to become apparent as a charge-transfer complex, and the material becomes slightly more fungicidal at the expense of stability.

If too much iodine is added, the material is liable to become an insoluble oil.

EXAMPLE 2

If the same reaction is repeated using, in place of Ethomeen C/12 the equivalent weight of a commercial oleylamine of which each mol is condensed with 2–5 mols of ethylene oxide, a brownish opaque solid with disinfectant properties is produced.

EXAMPLE 3

150 grams of Ethomeen C/12 were heated to 90° C. and vigorously stirred. Chlorine gas was passed in and the temperature rose to 135° C. Further additions of chlorine gas was made at a rate which was controlled to maintain the temperature at 135° C. until 17.7 grams in all had been taken up. Stirring was continued for 10 minutes and the mixture allowed to cool.

An aliquot diluted to 1% w./v. with distilled water gave a pH in the range of 3.5 to 3.9.

The product which had a brown colour had substantially the same powerful germicidal qualities and resistance to organic contamination as the product of Example 1.

EXAMPLE 4

145 grams (1 mol) of n-propyl diethanolamine are dissolved in 500 ml. methylene chloride, and 120 grams of iodine dissolved in 500 ml. methylene chloride are added slowly at room temperature.

The mixture may be left at room temperature for 24 hours when the material separates as an oil at the bottom of the vessel, whereupon the solvent can be decanted off.

Alternatively, the mixture of amine and iodine in methylene chloride can be brought to the boil immediately after mixing and the solvent boiled off; the rise in temperature occasioned by the boiling of the solvent causes the reaction between the amine and iodine to occur before the solvent is removed.

Lower members of the hydroxyalkyl series can be made similarly.

Although the materials of higher molecular weight can also be made similarly, getting rid of the solvent becomes more of a problem.

EXAMPLE 5

A molar solution of triethanolamine is reacted with a 0.5 molar solution of $I_2$ (i.e. a one-atom equivalent) at a temperature of 40° to 50° C. The triethanolamine should be relatively pure, for example with a specification as follows:

Molecular weight _____ 149.2
Specific gravity $t/20°$ C. _____ 1.128
Boiling point 760 mm. Hg, ° C. _____ 286
Viscosity 20° C. (centistokes) _____ 900

Both this material, and the similar product using tripropanolamine, are effective, easily prepared, disinfectants.

What is claimed is:

1. As a composition of matter the material obtained by reacting a halogen with at least one amine of the formula

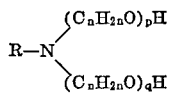

where R is a monovalent alkyl or alkenyl radical with up to 18 carbon atoms or a hydroxyalkyl radical with from 2 to 18 carbon atoms, $n$ is 2, 3 or 4 and the average of the totals of $p$ plus $q$ is not less than 1.5 nor more than 5.

2. The material of claim 1 where the average of the totals of $p$ plus $q$ is not less than 2 nor more than 5.

3. The material of claim 1 where R is the group $C_mH_{2m+1}$, where $m$ is at least 3.

4. The material of claim 1 where the halogen is iodine or chlorine.

5. The material of claim 1 being the material obtained by reacting between 0.5 and 1 atom equivalent of the halogen with each mole equivalent of the amine.

6. The material of claim 5 where R is the group $C_mH_{2m+1}$, where $m$ is at least 3.

7. The material of claim 5 where the halogen is iodine or chlorine.

References Cited

UNITED STATES PATENTS 3,534,102  10/1970  Waldstein _____ 260—584 B

LEWIS GOTTS, Primary Examiner

R. L. RAYMOND, Assistant Examiner

U.S. Cl. X.R.

424—325